United States Patent
Mueller

(10) Patent No.: US 8,590,870 B2
(45) Date of Patent: Nov. 26, 2013

(54) RETRACTION BALL FOR A HYDROSTATIC PISTON MACHINE

(75) Inventor: Dino Mueller, Freudenstadt (DE)

(73) Assignee: Robert Bosch GmbH, Stuttgart (DE)

(*) Notice: Subject to any disclaimer, the term of this patent is extended or adjusted under 35 U.S.C. 154(b) by 654 days.

(21) Appl. No.: 12/855,293

(22) Filed: Aug. 12, 2010

(65) Prior Publication Data

US 2011/0030549 A1 Feb. 10, 2011

Related U.S. Application Data

(63) Continuation of application No. PCT/EP2009/001148, filed on Feb. 18, 2009.

(30) Foreign Application Priority Data

Feb. 19, 2008 (DE) .......................... 10 2008 009 815

(51) Int. Cl.
*F16F 1/06* (2006.01)

(52) U.S. Cl.
USPC .......................................... 267/179; 267/175

(58) Field of Classification Search
USPC ........... 267/170, 174, 178, 179, 175; 92/12.2, 92/71
See application file for complete search history.

(56) References Cited

U.S. PATENT DOCUMENTS

| 5,279,205 | A | | 1/1994 | Carlson, Jr. et al. |
| 5,306,086 | A | * | 4/1994 | Orlowski et al. ................ 267/89 |
| 5,772,191 | A | * | 6/1998 | Nakano et al. ................. 267/289 |
| 6,375,171 | B1 | * | 4/2002 | Zimmermann et al. ....... 267/137 |
| 6,405,634 | B1 | | 6/2002 | Hansen |
| 6,880,450 | B2 | | 4/2005 | Stölzer |
| 7,270,320 | B2 | * | 9/2007 | Menzel et al. ................. 267/175 |
| 7,357,381 | B2 | * | 4/2008 | Wakamori et al. ............ 267/179 |
| 7,374,157 | B2 | * | 5/2008 | Wakamori et al. ............ 267/179 |

FOREIGN PATENT DOCUMENTS

| DE | 36 09 127 C2 | 5/1988 |
| DE | 198 03 233 A1 | 11/1998 |
| DE | 199 53 766 C1 | 8/2001 |
| DE | 100 35 630 C1 | 3/2002 |
| DE | 696 16 721 T2 | 5/2002 |
| DE | 20 2006 000 743 U1 | 5/2006 |
| EP | 0 778 166 B1 | 11/2001 |
| EP | 1 493 937 A1 | 1/2005 |
| JP | 2003-25165 A | 1/2003 |
| WO | WO 98/37308 | 8/1998 |
| WO | WO 2007/118624 A1 | 10/2007 |

* cited by examiner

*Primary Examiner* — Christopher Schwartz
(74) *Attorney, Agent, or Firm* — Muncy, Geissler, Olds & Lowe, PLLC

(57) ABSTRACT

A retraction ball and a system made of a retraction ball and an elastic element for a hydrostatic piston machine is provided, having at least one recess for accommodating an elastic element, and at least one structural element being disposed in the recess for locking the elastic element.

11 Claims, 5 Drawing Sheets

RETRACTION BALL FOR A HYDROSTATIC PISTON MACHINE

This nonprovisional application is a continuation of International Application No. PCT/EP2009/001148, which was filed on Feb. 18, 2009, and which claims priority to German Patent Application No. DE 10 2008 009 815.9, which was filed in Germany on Feb. 19, 2008, and which are both herein incorporated by reference.

BACKGROUND OF THE INVENTION

1. Field of the Invention

The invention relates to a retraction ball for a hydrostatic piston machine and a system comprising a retraction ball for a hydrostatic piston machine and at least one elastic element, wherein the retraction ball provides a recess for the accommodation of the elastic element, in which a structural element is formed for the locking of the elastic element.

2. Description of the Background Art

An axial piston machine with a housing, in the interior space of which a cylindrical drum is mounted, is known from DE 100 35 630 C1, which corresponds to U.S. Pat. No. 6,880,450. The cylindrical drum is mounted about a coaxial drive shaft and connected to the latter in a rotationally rigid manner. Axially extending piston boreholes, in which pistons are guided in a displaceable manner, are formed within the cylindrical drum. The pistons are supported via guide shoes against a rotating disk. The rotating disk is mounted in a rotatable manner about a rotational axis extending perpendicular to the axis of the drive shaft and forms a diagonal running surface, over which the guide shoes can slide. During the functional operation of the axial piston machine, the drive shaft and the cylindrical drum rotate about a common axis. The pistons are displaced in a reciprocating manner within the piston boreholes. A lifting of the guide shoes from the running surface during the suction stroke is prevented by a retraction device. The retraction device holds the guide shoe in contact with the running surface. The retraction device is formed by a retraction disk, which engages behind the flange of the guide shoe. The retraction disk is supported axially with a spherical-zone-shaped, concave bearing surface against a correspondingly spherical-zone-shaped, convex bearing surface of a so-called retraction ball. The retraction ball is preferably connected in a rotationally rigid manner to the drive shaft by a multi-toothed coupling and is mounted on the drive shaft in an axially displaceable manner and supported in the direction towards the cylindrical drum.

The use of springs to support the retraction ball in the direction towards the cylindrical drum is known. Accordingly, the support is elastic, and the position of the retraction ball is adapted to the changing conditions during operation, for example, through the influence of temperature. Recesses are formed in the retraction ball to accommodate the springs in the retraction ball.

The disadvantage with the previous recesses or respectively with the previous system having a retraction ball and incorporated springs is that the springs can fall out during the fitting or removal of the system into or from the axial piston machine. This makes the fitting or removal awkward. Attaching the springs in the recesses of the retraction ball for a simplified fitting of the retraction ball using grease or high-viscosity material is known. This method has the disadvantage that the grease or the high-viscosity material is drained from the recesses in the axial piston machine because of high operating temperatures and because of leakage flows, and the springs can fall out again during the removal of the retraction ball. Fixing the springs in the recesses of the retraction ball is not permanent and only simplifies the fitting, but not the removal of the system comprising the retraction ball and the incorporated springs.

SUMMARY OF THE INVENTION

It is therefore an object of the invention to provide a retraction ball for a hydrostatic piston machine or a system comprising a retraction ball for a hydrostatic piston machine and at least one elastic element, which allows/allow a permanent locking of the elastic element.

The object is achieved by the retraction ball according to an embodiment of the invention for a hydrostatic piston machine or respectively the system according to an embodiment of the invention comprising a retraction ball for a hydrostatic piston machine with at least one elastic element.

The system according to the invention provides a retraction ball for a hydrostatic piston machine and at least one elastic element. A recess is formed in the retraction ball for the accommodation of the elastic element. The recess provides a structural element for locking the elastic element. A permanent locking of the elastic element is achieved by the structural element for locking the elastic element.

In an embodiment, the structural element for locking the elastic element can be deformed in a plastic manner. Accordingly, the form can be adapted to the requirements for holding the previously inserted elastic element through a subsequent processing of the structural element.

In an embodiment, the structural element for locking the elastic element can be deformed in a plastic manner so that the equilibrium form of the structural element is adapted to the requirements.

In another embodiment, the structural element for locking the elastic element can be deformed in an elastic manner. Accordingly, the structural element can be deformed in a reversible manner, for example, for fitting or removal of an elastic element into the recess of the retraction ball thereby simplifying the fitting or respectively removal. Moreover, the resetting force, provided by the structural element when brought out of its equilibrium form, can be used to lock the elastic element.

In an embodiment, the structural element for locking the elastic element can be deformed in an elastic manner. In this condition, the structural element locks the elastic element with the assistance of the resetting force.

The elastic element can be locked in a form-fit manner within the recess. A form-fit locking provides a reliable locking, which locks the elastic element even under considerable mechanical stress.

In an embodiment, the elastic element can be locked in a force-fit manner in the recess. Through a force-fit locking, the elastic element can be removed from the recess by an adequate mechanical stress when required. A replacement of the elastic element is facilitated in this manner.

In an embodiment, the recess provides at least one cylindrical portion, in which the structural element can be formed. The cylindrical portion in the recess is particularly suitable for the accommodation of cylindrical, elastic elements, such as cylindrically wound spiral springs.

In an embodiment, the structural element can be formed as a coaxial, hollow cylinder. Through a simple plastic deformation of the structural element formed as a coaxial, hollow cylinder after the fitting of the elastic element in the cylindrical portion of the recess, an advantageous, permanent, form-fit locking of the elastic element can be realised through the formation of an undercut.

The structural element can lock the elastic element by means of an undercut. Accordingly, a form-fit locking is realised, which prevents the elastic element from falling out of the recess.

The elastic element can be a spiral spring. An elastic element of this kind is simple to manufacture, fit, remove and replace without sacrificing functionality. The costs and the difficulty for manufacture and maintenance of the system according to the invention are therefore reduced.

The locking especially through an undercut can then be implemented in a particularly simple manner on one of the first windings.

In an embodiment, the retraction ball and the structural element comprise injection-moulded synthetic material. Accordingly, a simple plastic and also an advantageous elastic deformability of the structural element are achieved with a low component weight.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
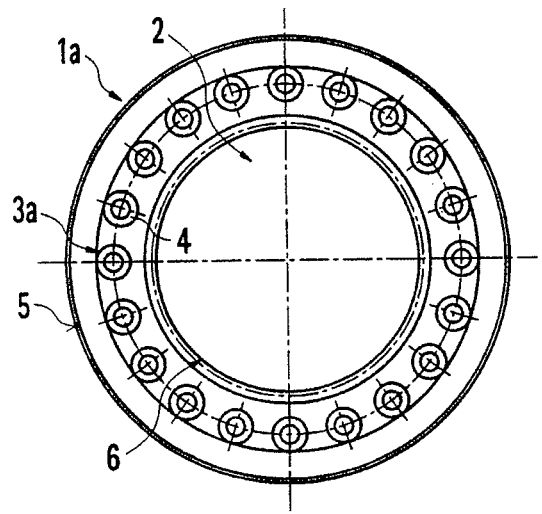
FIG. 1 shows a plan view of a retraction ball from the prior art.

FIG. 1 illustrates a plan view of a known system comprising a retraction ball 1a and springs 4 known from the prior art. The system comprises a known retraction ball 1a with a bearing borehole 2.

Figure 2:
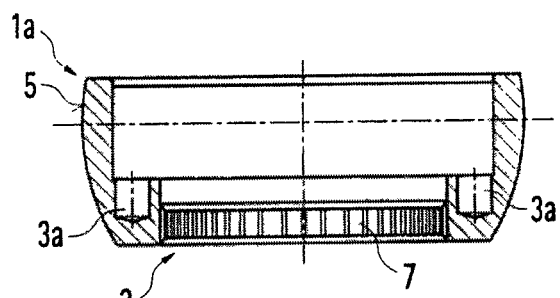
FIG. 2 shows a section of a retraction ball from the prior art.
Figure 3:
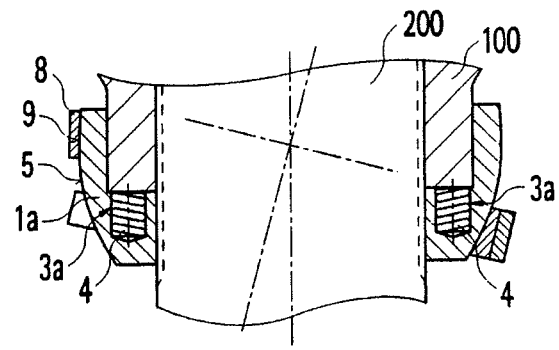
FIG. 3 shows a section of a retraction ball fitted in an axial piston machine from the prior art.

The bearing borehole 2 is used for the accommodation of a drive shaft 200, shown in FIG. 3, of an axial piston machine, which is not illustrated here. Several known recesses 3a, in each of which a spring 4 is accommodated, are formed in the known retraction ball 1a. The known recesses 3a are formed in a cylindrical shape. The springs 4 are designed as cylindrical springs made of steel wire. A spherical-zone-shaped, convex bearing surface 5, of which the cross-section is shown in FIG. 2, is formed at the outer edge of the known retraction ball 1a. The bearing borehole 2 is limited by a bearing-borehole limit 6.

FIG. 2 shows a section through the known retraction ball 1a illustrated in FIG. 1 and through two of the known, cylindrical recesses 3a in the known retraction ball 1. The bearing-borehole limit 6 of the bearing borehole 2 is designed as an internally toothed cogwheel collar 7. In FIG. 2, the section of the spherical-zone-shaped convex bearing surface 5 is presented in detail.

FIG. 3 shows a section through a known retraction ball 1a fitted in a not-completely illustrated axial piston machine. In the known recesses 3a of the known retraction ball 1a, springs 4 are fitted, by means of which the known retraction ball 1a is supported in an elastic manner on a cylindrical drum 100 of the axial piston machine. The force, with which the known retraction ball 1a is pressed against the cylindrical drum 100, is supplied to the known retraction ball 1a via a retraction disk 8, with which guide shoes, not illustrated, of the axial piston machine are held in contact with a not-illustrated diagonal surface of the axial piston machine. For this purpose, the retraction disk 8 is supported with a spherical-zone-shaped, concave bearing surface 9 against the correspondingly spherical-zone-shaped convex bearing surface 5 of the retraction ball 1. Through the influence of the springs 4, component tolerances are compensated and an improved operation of the axial piston machine is secured. Accordingly, the demands to be placed on the components are reduced, and a good operation of the axial piston machine can be achieved more simply.

Figure 4:
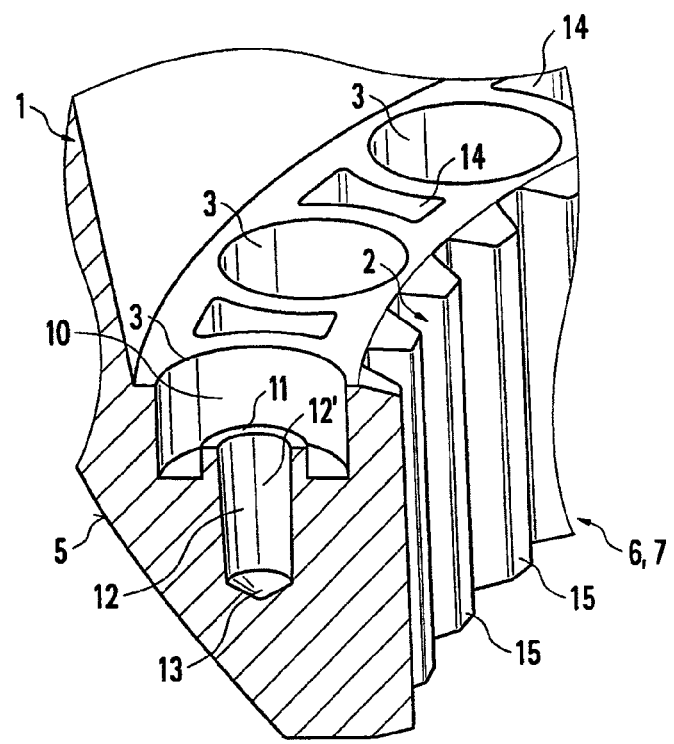
FIG. 4 shows a partial section through a retraction ball according to the invention.
Figure 5:
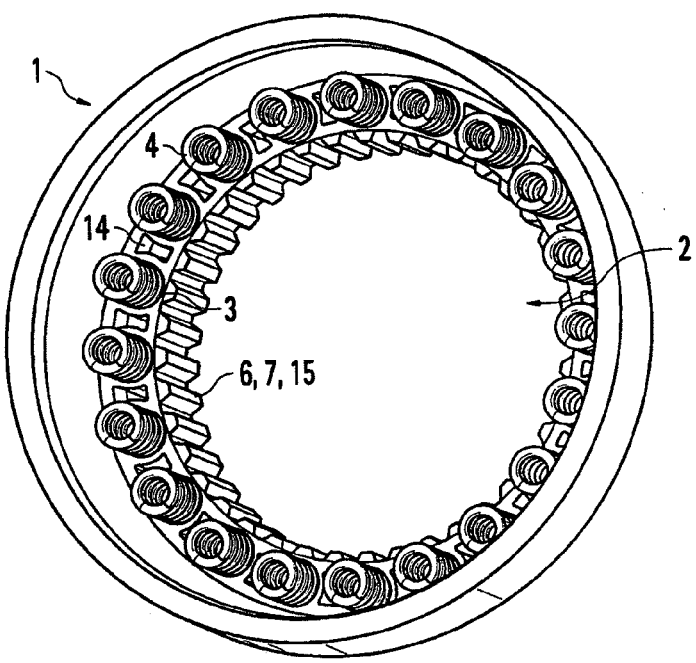
FIG. 5 shows a perspective plan view of a retraction ball according to the invention.

FIG. 4 presents a section through a region of the retraction ball 1 illustrated in perspective in FIG. 5. Recesses 3 according to an embodiment of the invention are formed between the spherical-zone-shaped, convex bearing surface 5 and the bearing-borehole limit 6 of the bearing borehole 2 designed as an internally toothed cogwheel collar 7 with teeth 15. The recesses 3 comprise a first cylindrical portion 10 and a coaxial, second cylindrical portion 12 of smaller diameter. The coaxial, second cylindrical portion 12 opens into a blind borehole 13. A structural element 11 formed as a coaxial, hollow cylinder is provided in the first cylindrical portion 10. Through this structural element 11 formed as a hollow cylinder, a further coaxial, cylindrical portion 12', which connects the first cylindrical portion 10 to the coaxial, second cylindrical portion 12, is additionally formed within the first cylindrical portion 10. Recesses 14 are provided to reduce the weight of the retraction ball 1.

FIG. 5 shows a perspective plan view of a system according to an embodiment of the invention comprising a retraction ball 1 and springs 4. The springs 4 are positioned in the recesses 3. The bearing-borehole limit 6 is designed as an internally toothed cogwheel collar 7, of which the teeth 15 project into the bearing borehole 2 and which cooperate with a corresponding embodiment of the drive shaft 200 to form a rotationally rigid, axially displaceable connection.

Figure 6A:
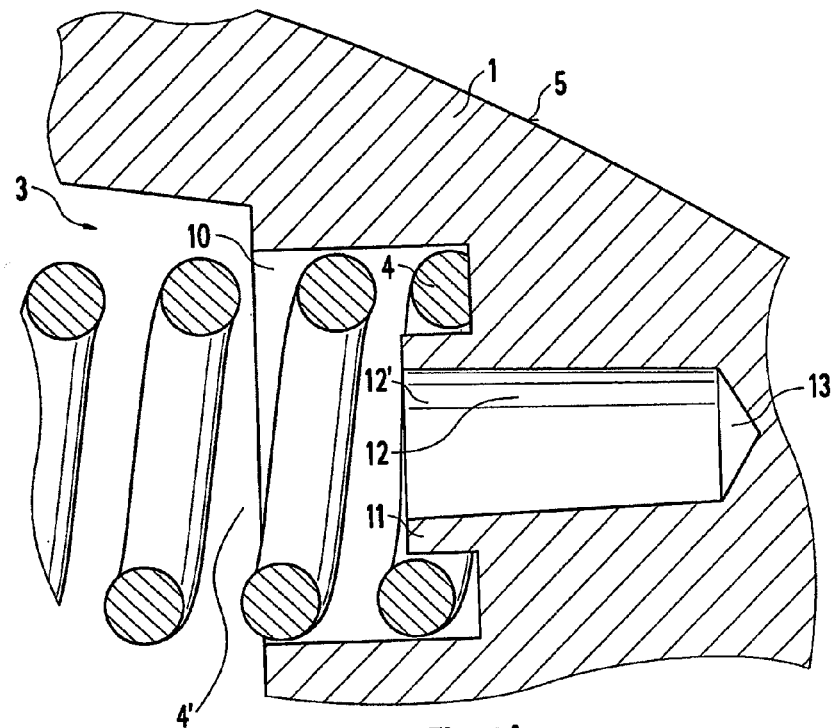
FIG. 6a shows a first section through a region of a retraction ball according to the invention.
Figure 6B:
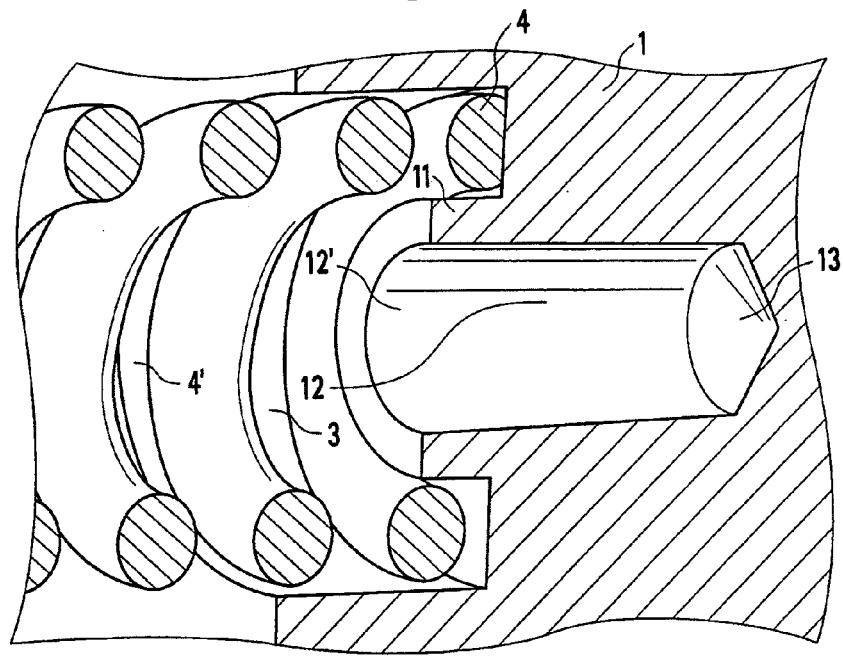
FIG. 6b shows a second section through a region of a retraction ball according to the invention.

FIGS. 6A and 6B show a cross section and a perspective section through a region of a retraction ball 1 according to an embodiment of the invention before its processing. A spring 4, which is a spiral spring made from round wire, which encloses an approximately cylindrical, hollow space 4', is disposed in the recess 3. The spring 4 and the hollow space 4' are positioned in a coaxial manner in the first cylindrical region 10 within the latter. The spring 4 is positioned at the maximal depth and cannot therefore be moved further in the axial direction towards the blind borehole 13 at the end of the second cylindrical portion 12. The structural element 11 formed in the first cylindrical portion 10 projects into the hollow space 4' formed by the spring 4.

Figure 7A:
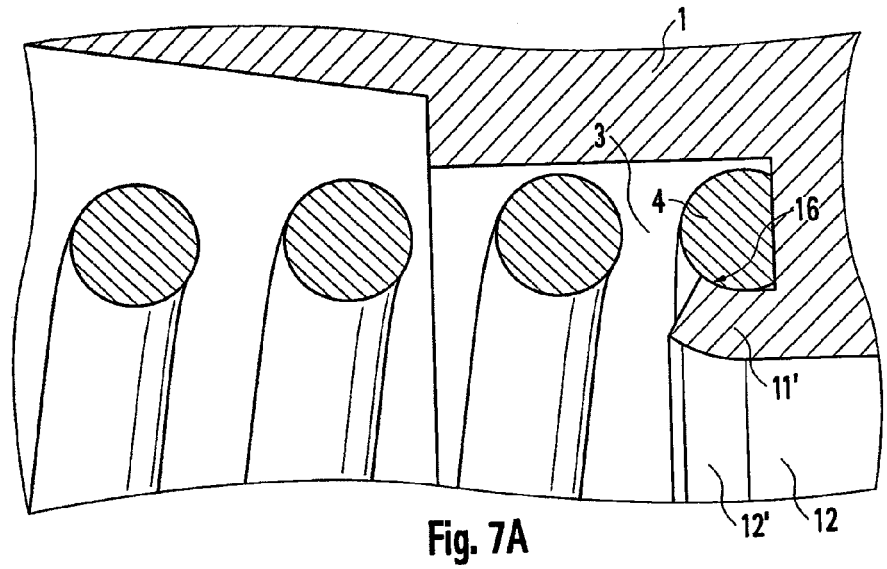
FIG. 7a shows a first section through a region of a system according to the invention after a forming process.
Figure 7B:
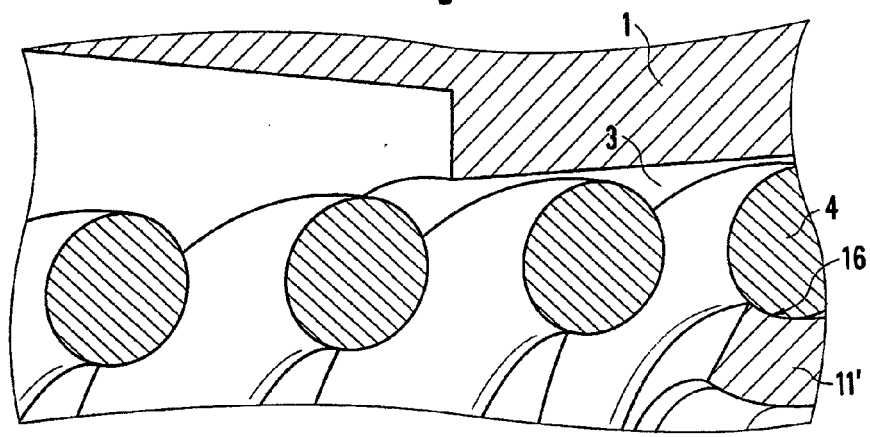
FIG. 7b shows a second section through a region of a system according to the invention after a forming process.
Figure 7C:
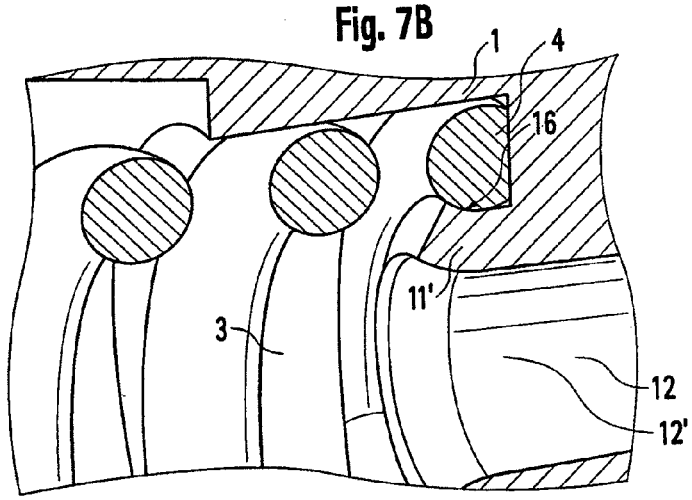
FIG. 7c shows a third section through a region of a system according to the invention after a forming process.

FIGS. 7A, 7B and 7C each show a section or respectively a perspective section through a region of a system according to an embodiment of the invention comprising a retraction ball 1 and springs 4. The spring 4 made from round wire is accommodated at the maximal depth in the recess 3 of the retraction ball 1 and locked in a form-fit manner by a processed structural element 11' by means of an undercut 16. Accordingly, the axial position of the spring 4 is fixed. The spring is locked in a form-fit and permanent manner by means of the undercut 16 and cannot therefore fall out of the recess 3.

The processed structural element 11' projects from the structural element 11 through plastic deformation. The plastic deformation is achieved through the effect of heat and/or force. For this purpose, appropriately formed tools are used for the desired plastic deformation. The supply of heat is provided via pre-heated tools or through a heater independent from the tools.

In the exemplary embodiment presented, the one-piece retraction ball 1 according to an embodiment of the invention comprises injection-moulded synthetic material. However, the retraction ball 1 can also comprise several parts. Each part can then comprise any required material, provided that at least the structural element comprises an arbitrary material deformable in a plastic manner. As an alternative, an additionally elastically deformable material can also be selected. Through the elastic deformability, the processed structural element 11' can be elastically deformed in a reversible manner out of its plastically determined equilibrium position in the event of or for a fitting or removal of an elastic element, for example, a spring 4. Accordingly, a permanent locking of the elastic element with a simple fitting and respectively removal of the elastic element can be combined. In addition to different synthetic materials, different metals or respectively metal alloys can also be used.

The spring 4 in the illustrated exemplary embodiment is a cylindrical spiral spring made of metal wire. Alternatively, for example, a barrel-shaped, formed elastic element made of another elastic material can be used.

In the exemplary embodiment illustrated, the locking is a form-fit locking. As an alternative, a force-fit locking can be selected. For example, a force-fit locking, which is not accompanied by a form-fit locking, for example, with an undercut 16, can be realised by widening the diameter of the illustrated structural element 11.

In the illustrated exemplary embodiment, the recesses 3 of the retraction ball 1 comprise the first cylindrical portion 10, the axially following, coaxial, second cylindrical portion 12, which opens into the blind borehole 13, and the structural element 11 formed in the first cylindrical portion 10 as a coaxial, hollow cylinder, in which the further coaxial, cylindrical portion 12' is formed, which connects the first cylindrical portion 10 to the coaxial, second cylindrical portion 12. Alternatively, the recess 3 and the structural element 11 can each assume shapes such that the recess can accommodate the elastic element, and that the structural element can be deformed in such a manner that a permanent form-fit and/or force-fit locking of the elastic element within the recess is possible. The form fit and force fit can also relate respectively to different degrees of freedom of movement of the elastic element within the recess. For example, in the illustrated exemplary embodiment, the processed structural element 11' locks the spring 4 in a form-fit manner in the axial direction by means of the undercut 16. However, a twisting out of the spring 4 by rotation is still possible. Through a widening of the processed structural element 11', a rotation of the spring 4 can be additionally prevented by a force fit. Accordingly, the spring 4 is locked with regard to axial displacement in a form-fit manner and with regard to rotation in a force-fit manner. A falling out of the spring 4 through an undesired rotation of the spring 4 is therefore prevented.

Figure 8:
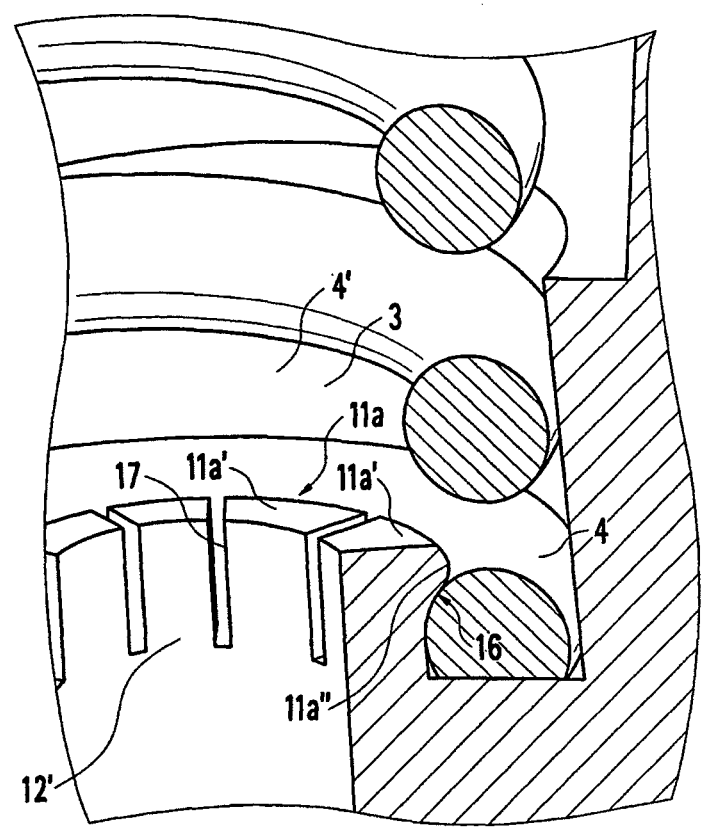
FIG. 8 shows a third section through a region of an alternative system according to the invention with an alternative structural element.

FIG. 8 shows a third section through a region of an alternative system according to an embodiment of the invention with an alternative structural element 11a. The alternative structural element 11a provides individual structural element portions 11a', which are disposed side-by-side along a hollow cylindrical portion, which is formed coaxially around the further cylindrical portion 12'. The further cylindrical portion 12' opens into the hollow space 4' formed by the cylindrical spring 4. A swelling 11a" formed as a knob directed radially outwards is formed on one alternative structural element 11a, which locks the spring 4 fitted in the recess 3 in an axial, form-fit manner. The swelling 11a" forms the undercut 16, with which the spring 4 is locked in a form-fit manner. The lower structural element 11a' can be deformed in an elastic manner. Additionally, the swelling 11a" is designed in such a manner that the spring 4 can be fitted into the recess 3 and removed from the latter again, wherein the lower structural element 11a' is deformed in an elastic manner during fitting and/or removal and snaps back again into the illustrated equilibrium form after the completed fitting or removal. The structural sub-elements 11a' are each separated from one another by slots 17 and are each separately deformable in an elastic manner independently of the respective other. The necessary motional play is secured by the slots 17.

Figure 9:
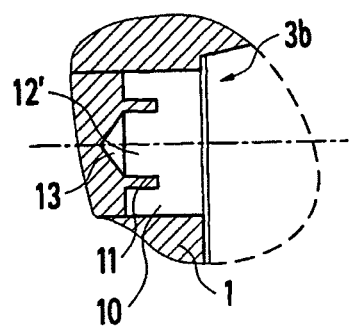
FIG. 9 shows a section through a further recess of a retraction ball according to the invention.

FIG. 9 shows a further recess 3b, which can be selected as an alternative to the recess 3. In the retraction ball 1, the further recess 3b comprises the first cylindrical portion 10, in which the structural element 11 formed as a coaxial hollow cylinder is provided, and the blind borehole 13, into which the further cylindrical portion 12' formed by the structural element 11 opens. The further cylindrical portion 12' connects the first cylindrical portion 10 to the blind borehole 13.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A retraction ball for a hydrostatic piston machine comprising:
    a plurality of recesses equally distributed over a circumference of the retraction ball, each of the plurality of recesses being configured to accommodate an elastic element; and
    at least one structural element formed in each of the plurality of recesses, the structural element being adapted to lock the elastic element,
    wherein each of the plurality of recesses provides a first cylindrical portion in which the structural element is formed, and
    wherein the structural element in the first cylindrical portion is formed as a hollow cylinder that is coaxially arranged with respect to the first cylindrical portion.

2. The retraction ball according to claim 1, wherein the structural element for locking the elastic element is deformable in a plastic manner.

3. The retraction ball according to claim 1, wherein the structural element for locking the plastic element is deformable in an elastic manner.

4. The retraction ball according to claim 1, wherein the retraction ball and the structural element are formed of injection-moulded synthetic material.

5. A system comprising:

a retraction ball for a hydrostatic piston machine; and a plurality of elastic elements, wherein the retraction ball provides a plurality of recesses distributed over a circumference of the retraction ball, wherein each of the plurality of recesses are configured for the accommodation of an elastic element of the plurality of elastic elements, wherein each of the plurality of recesses provides a structural element for the locking of the elastic element processed after insertion of the elastic element and provides a first cylindrical portion in which the structural element is formed, and wherein the structural element in the first cylindrical portion is formed as, a hollow cylinder being coaxially arranged with respect to the first cylindrical portion.

6. The retraction ball according to claim 5, wherein the processed structural element for locking the elastic element is deformed in a plastic manner.

7. The retraction ball according to claim 5, wherein the elastic element is locked in a form-ftt manner within the recess.

8. The retraction ball according to claim 5, wherein the elastic element is locked in a force-fit manner within the recess.

9. The retraction ball according to claim 5, wherein the processed structural element locks the elastic element via an undercut.

10. The retraction ball according to claim 5, wherein the elastic element is a spiral spring.

11. The retraction ball according to claim 5, wherein the retraction ball and the processed structural element are formed of injection-moulded synthetic material.

* * * * *